E. L. POLANSKY.
ATTACHMENT FOR TRACTOR WHEELS.
APPLICATION FILED MAR. 5, 1920.
1,389,269.
Patented Aug. 30, 1921.
2 SHEETS—SHEET 1.
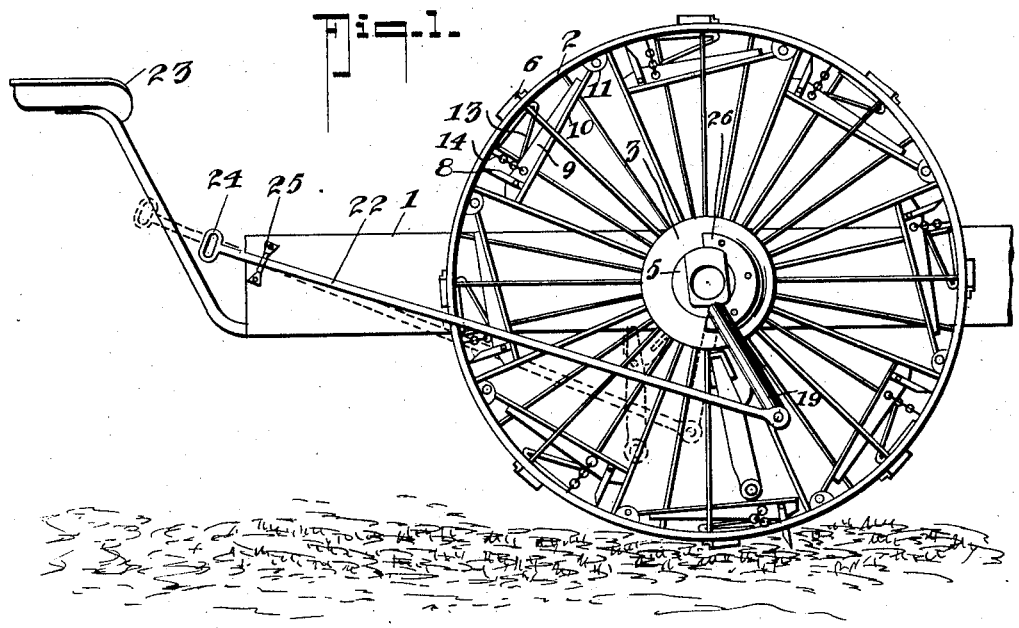
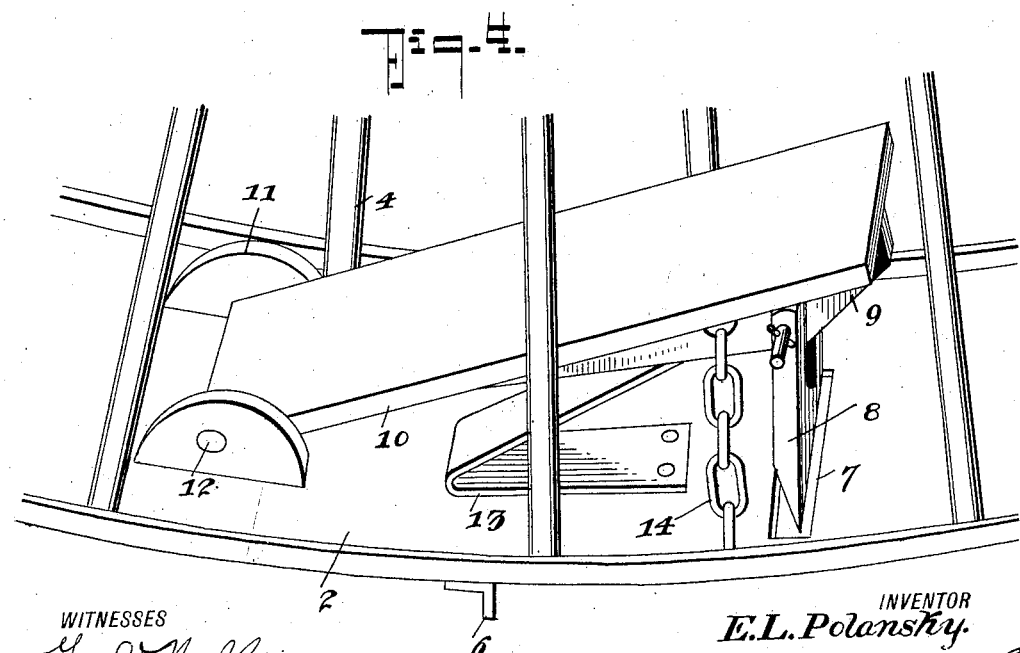
WITNESSES
INVENTOR
E. L. Polansky.
BY
ATTORNEYS

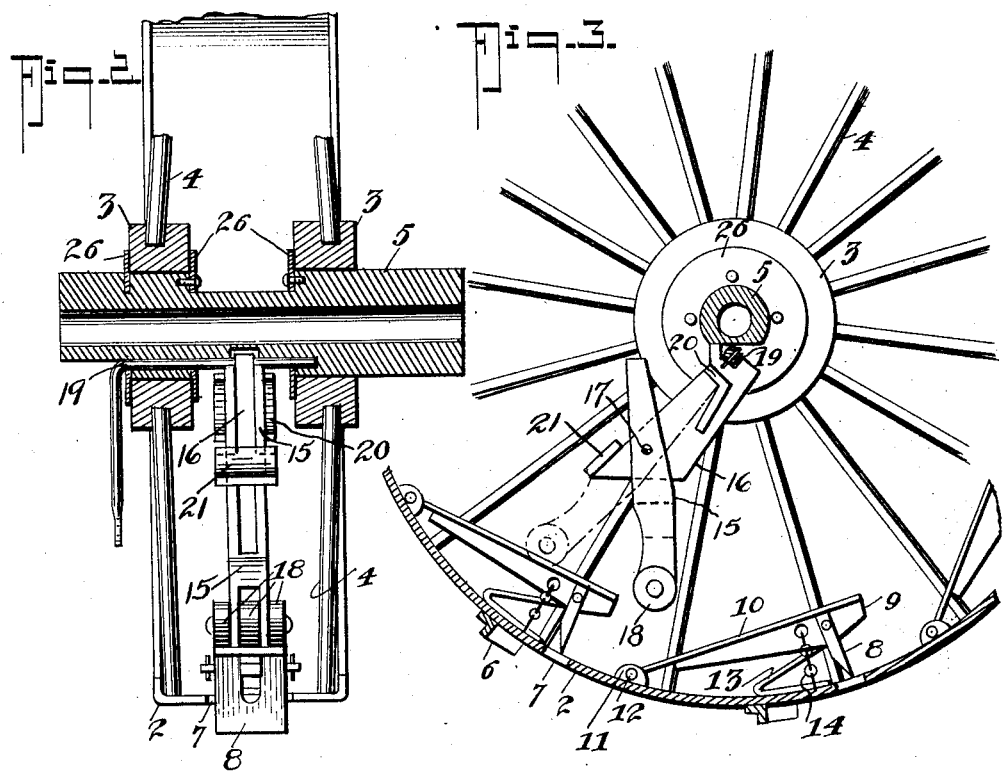
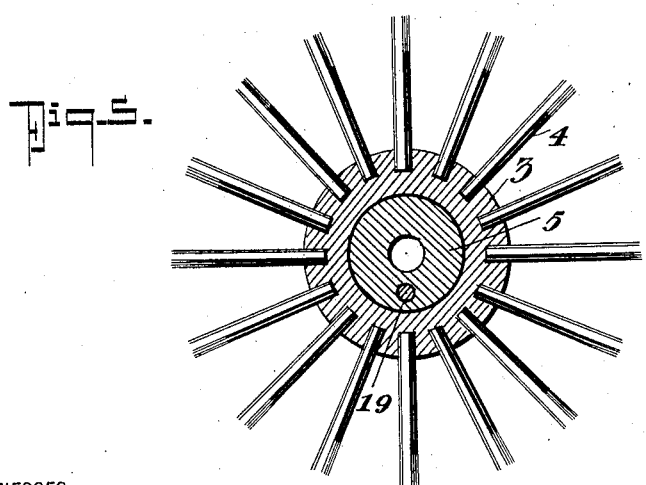

UNITED STATES PATENT OFFICE.

EMIL LOUIS POLANSKY, OF MUNDEN, KANSAS.

ATTACHMENT FOR TRACTOR-WHEELS.

1,389,269.  Specification of Letters Patent.  Patented Aug. 30, 1921.

Application filed March 5, 1920. Serial No. 363,417.

*To all whom it may concern:*

Be it known that I, EMIL LOUIS POLANSKY, a citizen of the United States, and a resident of Munden, in the county of Republic and State of Kansas, have invented certain new and useful Improvements in Attachments for Tractor-Wheels, of which the following is a specification.

My invention is an improvement in attachments for tractor wheels, and has for its object to provide an attachment of the character specified, adapted for tractor wheels of any character, as for instance, binders and the like, wherein the wheel carries a series of cleats or spurs, capable of being extended beyond the rim of the wheel, and normally spring held in retracted position within the periphery of the wheel, together with means operable from a distance, for moving said cleats into operative position at that part of the wheel which is in engagement with the ground.

In the drawings:

Figure 1 is a side view of the improved tractor wheel,

Fig. 2 is a partial vertical section,

Fig. 3 is a partial section in the plane of the wheel,

Fig. 4 is a perspective view of a portion of the rim of the wheel,

Fig. 5 is a partial section at the center of the hub in the plane of the wheel.

The present embodiment of the invention is shown in connection with the tractor wheel of a binder, whose frame is indicated at 1, and the improved wheel comprises a rim 2 and a hub 3 connected to the rim by spokes 4. This hub 3 is composed of two co-axial laterally spaced rings, and these rings are journaled on a hollow shaft 5.

The rim has the usual cleats 6 on its periphery, and adjacent to each of the cleats 6 there is provided in the rim a transverse slot 7 through which is adapted to extend a spur or cleat 8 in the form of a blade. The inner end of each of these blades 8 is slotted longitudinally to engage opposite sides of a rib 9 on a plate 10 which is hinged between a pair of lugs 11 on the inner face of the rim, by means of journal pins 12 or the like.

A substantially V-shaped plate spring 13 is secured to the rim at each of the plates 10, between the said plate and the rim, each spring consisting of an arm secured to the rim and an arm engaging the rib 9, and acting normally to press the free end of the plate, that is the end provided with the cleat 8, inwardly toward the hub of the wheel.

Flexible members 14 are arranged between the plate and the rim, for limiting the inward movement of the plate under the influence of the spring, and all of the plates are arranged to be pressed outwardly when desired at the lower part of the wheel, that is, at that portion which is in engagement with the ground. The said means is in the form of a sectional arm 15—16, the sections being pivoted together at 17, the free end of the section 15 carrying rollers 18, while the end of the section 16 remote from the section 15 is secured to a crank shaft 19 journaled in the hollow shaft 5 eccentrically thereof, it being understood that this shaft is fixed.

The sections of the arm 15—16 are connected by a rule joint, so that their jointed end may swing freely rearwardly, but can not swing forwardly beyond the position where the sections are in substantial alinement. Referring to Fig. 3, it will be seen that the section 16 has a stop web 20 for engagement by the adjacent end of the section 15 to limit the forward movement of the sections at the joint. The section 16 also has a stop web 21 to limit the rearward swinging of the joint.

Referring to Fig. 2, it will be seen that the rollers 18 are three in number, the lower end of the section 15 being forked and one of the rollers is journaled between the arms of the fork, the other rollers being at the outer sides of the arms. The upper end of the section 15 is also forked, and the lower end of the section 16 is received between the arms of the fork.

A web 20 is provided on each side of the section 15 for engagement by the adjacent arm of the fork. Suitable operating mechanism may be connected with the frame of the crank shaft 19, as for instance, a link 22 which extends rearwardly to a point adjacent to the driver's seat 23 and has a loop 24 at its free end forming a grip. The loop is slidable through a guide 25 on the frame 1. The hub sections 3 are held on the shaft 5, by means of arc-shaped plates 26 which are secured to the hollow shaft, the inner portion of the shaft being reduced to receive the arc-shaped plates, as shown.

When operating over ground which is fairly hard, the spurs 8 are not brought into operation and therefore the arms 15 and 16 are positioned as illustrated in Fig. 3. It will be observed with reference to this figure that the rollers 18 are out of the path of travel of the plates 10 and therefore during the rotation of the wheel, the plates 10 will not contact with the rollers 18.

Where additional traction is desired, the spurs 8 may be brought into operation, and in that case, the arms 15 and 16 are extended as illustrated in Fig. 1, so that the rollers 18 will be arranged in the path of travel of the plates 10.

When the arms 15 and 16 are positioned in alinement, the clockwise rotation of the wheels will force the rollers 18 rearwardly so as to maintain contact between the forward edge of the arm 15 and the stop elements 20. The inclination of the plates will of course tend to urge the rollers 18 in a clockwise direction so that the arms 15 and 16 are held in alinement.

I claim:

1. A wheel of the character specified, comprising a hub, a rim, and spokes connecting the hub and the rim, and having in the rim transverse slots, plates hinged to the inner surface of the rim adjacent to the slots and provided at their free ends with spurs adapted to extend through the slots, springs normally pressing said plates inwardly, means for limiting the inward swinging movement of the plates to a point where the blades are within the periphery of the wheel, and manually operated means for engaging the plates as they pass beneath the hub to extend the spurs, said means comprising an arm consisting of sections connected by a rule joint for permitting them to swing freely rearwardly at their joint and for limiting their forward swinging movement to a point where they are in substantial alinement.

2. The combination with a wheel including a rim and a plurality of plates pivotally secured to the rim, said plates having spurs at their free ends movable through the rim, of a fixed axle supporting said wheel, a crank rod movably carried by said axle, and means carried by the crank rod for progressively advancing the said spurs through the rim, said means comprising adjustable sections whereby they may be held out of engagement with the said plates.

3. The combination with a wheel inclusive of a rim and a plurality of plates pivotally secured to the rim, said plates having spurs movable through the rim, of a fixed axle supporting said wheel, a crank carried by said axle and having an arm at one end, sectional and adjustable means carried by said crank rod for progressively advancing the spurs, and a rod connected to the arm of the crank rod for manually operating said spur advancing means.

EMIL LOUIS POLANSKY.